United States Patent [19]

Omura et al.

[11] Patent Number: 5,138,477
[45] Date of Patent: Aug. 11, 1992

[54] LIGHT DEFLECTING APPARATUS

[75] Inventors: Ken Omura, Tokyo; Seiichiro Fushimi, Yokohama, both of Japan

[73] Assignee: Kabushiki Kaisha Toshiba, Kawasaki, Japan

[21] Appl. No.: 603,231

[22] Filed: Oct. 25, 1990

[30] Foreign Application Priority Data

Oct. 27, 1989 [JP] Japan .................................. 1-278706

[51] Int. Cl.⁵ ............................................. G02B 26/10
[52] U.S. Cl. .................................... 359/200; 359/212; 359/216; 310/90; 384/461
[58] Field of Search ............... 359/216, 212, 218, 219, 359/200; 310/90, 109; 384/452, 453, 454, 455, 461; 250/234

[56] References Cited

U.S. PATENT DOCUMENTS

| | | |
|---|---|---|
| 1,506,856 | 9/1924 | McCluskey .................. 384/461 |
| 1,539,702 | 5/1925 | Szuba ........................... 384/461 |
| 2,822,225 | 2/1958 | Teufel .......................... 384/461 |
| 3,011,364 | 12/1961 | Mims ........................... 384/461 |
| 3,352,611 | 11/1967 | Seidel ........................... 384/461 |
| 3,547,503 | 6/1968 | Konet ........................... 384/461 |
| 3,597,029 | 8/1971 | Marcum ........................ 384/461 |
| 3,737,202 | 6/1973 | Rosales ......................... 384/461 |
| 4,133,587 | 1/1979 | Kume ........................... 384/461 |
| 4,623,216 | 11/1986 | Sato et al. ..................... 359/200 |
| 4,832,425 | 5/1989 | Walther et al. ............... 359/212 |

Primary Examiner—Loha Ben
Attorney, Agent, or Firm—Foley & Lardner

[57] ABSTRACT

In a light deflecting apparatus having a motor shaft rotatable at high speed, bearings have a suitable simple construction such that the whole apparatus can be reduced in size and weight.

11 Claims, 2 Drawing Sheets

LIGHT DEFLECTING APPARATUS

BACKGROUND OF THE INVENTION

1. Field of the Invention

The present invention relates to a light deflecting apparatus, and more particularly, to a light deflecting apparatus having an improved bearing arrangement.

2. Description of the Related Art

A scan-type optical system incorporated in a laser printer or some other apparatus of this kind is provided with a light deflecting apparatus for deflecting light beams. This light deflecting apparatus comprises a motor and a rotating polygon mirror. In this apparatus, an incident light beam is reflected at an equiangular speed, and the polygon mirror is used for deflection scanning. The rotating polygon mirror has a plurality of reflecting surfaces (e.g., four or eight surfaces), and is fixed to the rotating shaft of the motor. It scans information to be recorded on a photoreceptor. In doing this, the polygon mirror rotates at a speed (e.g., 16,000 rpm) much higher than the speed (peripheral speed) at which the photoreceptor rotates in its auxiliary scanning direction. Accordingly, the rotating shaft of the motor should be supported by means of bearings to absorb load attributable to its rotation. When using dynamic-pressure air bearings for this purpose, the manufacture of the bearings requires very high machining accuracy. Although the dynamic-pressure air bearings can stand prolonged continuous use relatively well, extremely high accuracy is required for the machining of the gap between the motor shaft and the bearings. When using bearings (e.g., ball bearings, roller bearings, etc.) with rolling bodies in the light deflecting apparatus, conventional ones, whose maximum allowable rotational frequency is low, sometimes cannot function as satisfactory bearings. In other words, the maximum allowable rotational frequency of the bearings with rolling bodies is so low that the bearings are liable to become eccentric due to insufficient lubrication or wear. Therefore, the bearings must be periodically replaced with new ones, and cannot stand prolonged continuous use. Thus, the bearings of this type require high machining accuracy and hence entail high costs if they are expected to fulfill their function. Inevitably, moreover, the apparatus must be large-sized.

SUMMARY OF THE INVENTION

The object of the present invention is to provide a light deflecting apparatus capable of satisfactorily absorbing load attributable to the rotation of the rotating shaft of a motor despite the use of conventional bearings.

A light deflecting apparatus according to the present invention comprises: a rotatable light reflector for light beam scanning; a rotating shaft; a first bearing for rotatably supporting the rotating shaft and a second bearing for rotatably supporting the first bearing, the first and second bearings being integral with each other; and drive means for rotating the rotating shaft, the drive means including a rotor coil, a rotatable member integral with the rotating shaft and fitted with the rotor coil, and a stator coil fixed to the body of the apparatus on the rotating-shaft side of the rotatable member so as to face the rotor coil.

In the light deflecting apparatus of the present invention, the first bearing supports the rotating shaft of a motor for rotation, and the second bearing supports the first bearing for rotation. As the motor rotates, therefore, the first bearing rotates at some relative speed with respect to the second bearing, while the second bearing rotates at some relative speed with respect to a stationary member. Thus, the load attributable to the rotation of the motor is dispersed by means of the first and second bearings. Accordingly, the load acting on each individual bearing is reduced, so that bearings of simple construction can be used without a problem. In consequence, the light deflecting apparatus can be reduced in size.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Preferred embodiments of the present invention will now be described with reference to the accompanying drawings.

Figure 1:
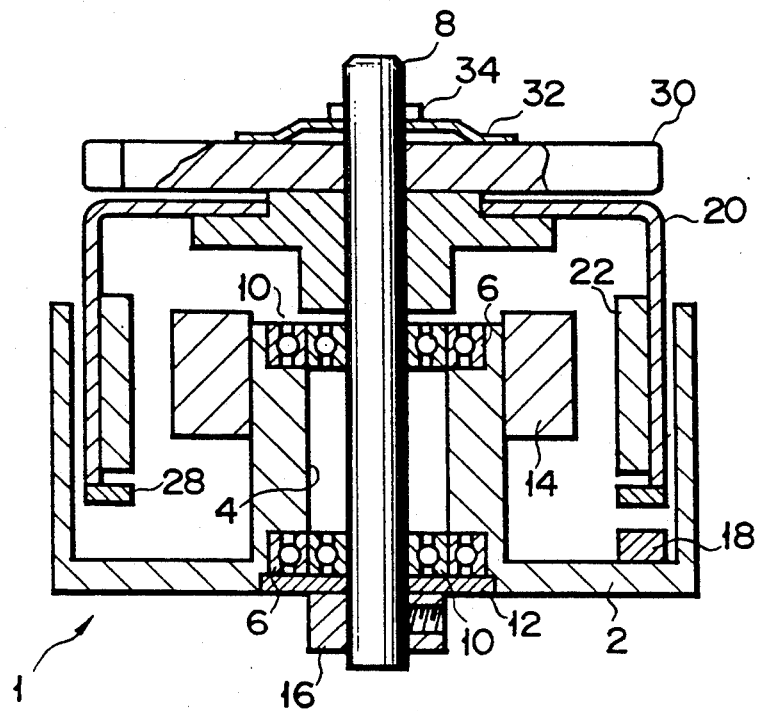
FIG. 1 is a sectional view of a light deflecting apparatus according to a first embodiment of the present invention.

FIG. 1 is a sectional view of a light deflecting apparatus according to a first embodiment of the present invention. The light deflecting apparatus 1 comprises a motor body 2 and a polygon mirror 30 divided in eight or twelve. The body 2 is fixed to an optical system base (not shown) which constitutes a scan-type optical system. The motor body 2, which has an inner cylinder 4, is furnished with power supply means (not shown) and a rotation sensor 18 for detecting the rotation of a motor. A stator coil 14 is fixed to the outside of the inner cylinder 4, while bearing support portions 6 are provided inside the cylinder 4. A plurality of bearing units 10, each formed of first and second bearings, are housed individually in the support portions 6. The first and second bearings of each bearing unit 10 are each formed of rolling bodies, such as balls, rollers, etc. A rotating shaft 8 of the motor is supported inside an inner ring portion of each bearing unit 10 for smooth rotation. The motor shaft 8 penetrates the respective inner rings of the bearing units 10. A rotor 20 for use as a rotating part of the motor is mounted on one end of the shaft 8. In a sectional view, rotor 20 is shaped like an inverted U. The rotor 20 is fitted with a rotor coil 22, which faces the stator coil 14, and a magnet 28 which, facing the rotation sensor 18, transmits the state of rotation. The rotor coil 22 generates a magnetic field for rotating the rotor 20 in a predetermined direction with respect to a magnetic field generated by the stator coil 14. The polygon mirror 30, along with the rotor 20, is fixed to that portion of the rotating shaft 8 situated outside the rotor 20 by means of a set spring 32 and a retaining ring 34. The motor shaft 8 is unremovably fixed, at the other end thereof, to the motor body 2 by means of a slide member 12, such as a thrust washer, and a fixing member 16.

The following is a description of the operation of the motor. A current for generating a predetermined magnetic field is caused to flow through the stator coil 14 of the motor base 2 by the power supply means (not shown). At the same time, a current used to generate the magnetic field for rotating the rotor 20 in the predetermined direction is caused to flow through the rotor coil 22 of the rotor 20, which is fixed to the rotating shaft 8. As a result, the rotor 20 is rotated in the predetermined direction. Also, the polygon mirror 30, which is fixed together with the rotor 20 to the rotating shaft 8, is rotated in the predetermined direction. The rotating state of the rotor 20 is controlled in accordance with the result of detection of the position of a magnet 28 attached to the rotor 20 by means of a rotation sensor 18. As a signal detected by the sensor 18 is processed in a motor control circuit (not shown), the current supplied to the stator coil 14 and the rotor coil 22 is controlled. As a result, the motor speed is controlled, so that the polygon mirror 30 is rotated at a predetermined speed.

Figure 2:
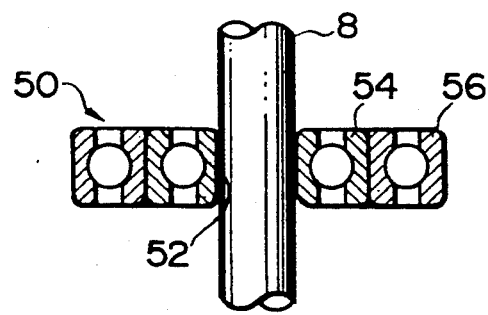
FIG. 2 is a sectional view showing a bearing unit used in the light deflecting apparatus of FIG. 1.

FIG. 2 shows in detail a bearing unit shown in FIG. 1. A bearing unit 50, which has a center hole 52 penetrated by the rotating shaft 8 of the motor, includes a first ball bearing 54 located inside and a second ball bearing 56 outside the same. The inner ring of the ball bearing 54 is in contact with the rotating shaft 8 so that the shaft 8 is supported thereby. The ball bearing 56 is supported by each of the bearing support portions 6 of the motor body 2.

The load on the rotating shaft 8 of the motor in rotation is first absorbed by the rotation of the ball bearing 54. When the shaft 8 is rotating, the load on the bearing 54 in rotation is further absorbed by the rotation of the ball bearing 56. More specifically, the load on the rotating shaft 8 is absorbed as the ball bearing 54 rotates at a certain relative speed with respect to the shaft 8, while the load on the bearing 54 is absorbed as the ball bearing 56 rotates at a certain relative speed with respect to the bearing 54. Thus, both the ball bearings 54 and 56 rotate relatively to the rotating shaft 8, so that the load on the outside ball bearing 56 is not all the load that is received from the shaft 8. In other words, the load is reduced by the rotation of the ball bearings 54 and 56. In this embodiment, it is necessary only that the ball bearings 54 and 56 are able to stand a rotating speed not lower than half that of the motor shaft 8. Therefore, these ball bearings may be conventional general-purpose bearings, and need not be any specially designed high-performance bearings.

Figure 3:
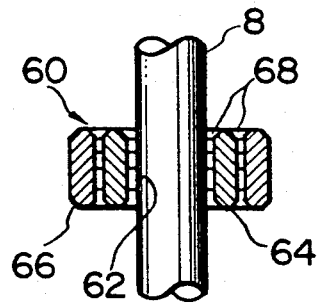
FIG. 3 is a sectional view showing one modification of the bearing unit of FIG. 2.

FIG. 3 shows a modification of the bearing unit shown in FIG. 2. In this modification, a bearing unit 60 with an alternative configuration is used in place of the bearing unit 50. The bearing unit 60, which has a center hole 62 penetrated by the rotating shaft 8 of the motor, includes inner and outer bearings 64 and 66. For example, the inner and outer bearings 64 and 66 of the bearing unit 60 are solid sleeve bearings having no rolling bodies.

Also in this modification, as in the case of the bearing unit 50 shown in FIG. 2, the inner bearing 64 absorbs the load on the rotating shaft 8 in rotation, while the outer bearing 66 absorbs the load on the inner bearing 64 in rotation. Vibrations of the shaft 8 and the bearings 64 and 66 can be absorbed by applying a lubricant 68 between the bearing 64 and the rotating shaft 8 and between the bearings 66 and 64.

Figure 4:
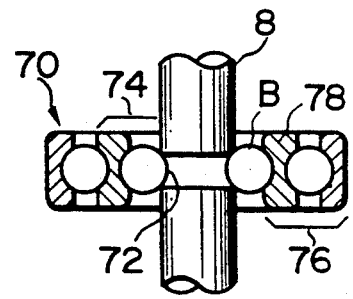
FIG. 4 is a sectional view showing another modification of the bearing unit of FIG. 2.

FIG. 4 shows another modification of the first embodiment. In this modification, a bearing unit 70 with another configuration is used in place of the bearing unit 50. The bearing unit 70, which is formed integrally with the rotating shaft 8, includes inner and outer bearings 74 and 76. The inner ball bearing 74 is designed so that its balls B are directly in contact with the rotating shaft 8. Further, the outer ring of the inner bearing 74 and the inner ring of the outer bearing 76 are identical with each other, constituting a common guide 78.

Also in this modification, as in the case of the bearing unit 50 shown in FIG. 2, the inner bearing 74 absorbs the load on the rotating shaft 8 in rotation, while the outer bearing 76 absorbs the load on the inner bearing 74 in rotation.

Figure 5:
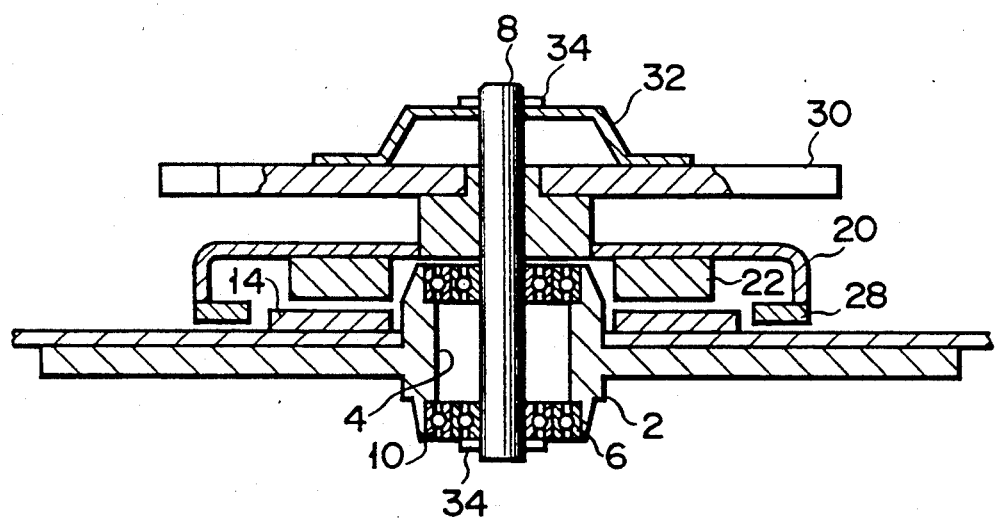
FIG. 5 is a sectional view of a light deflecting apparatus according to a second embodiment of the invention.

FIG. 5 shows a second embodiment of the present invention. In the description of the second embodiment to follow, like reference numerals are used to designate like members having the same functions as their counterparts in the first embodiment. In this second embodiment, dual-structure bearing units 10 are used in a general-purpose flat motor which is relatively easily available. A polygon mirror 30 is mounted on a rotating shaft 8, and a retaining ring 34 is attached to that end portion of the shaft 8 on the side opposite to the mirror 30. As regards the positional relationships, this embodiment differs from the first embodiment in that a stator coil 14 is attached not to an inner cylinder 4 but to a motor body 2.

The bearing unit 10 used in this embodiment resembles the one used in the first embodiment. Thus, the second embodiment can provide the same effect as the first embodiment.

In the light deflecting apparatus according to the present invention, the rotating shaft of the motor rotating at high speed is supported by means of a plurality of conventional simple bearings, e.g., ball bearings. Thus, if the first bearing, which is directly in contact with the rotating shaft of the motor, rotates at a speed higher than an allowable rotating speed, the second bearing supporting the first bearing also rotates at some high speed. Relatively to the second bearing, therefore, the first bearing rotates at a speed within an allowable range. Accordingly, the load is dispersed by the first and second bearings. Thus, it is unnecessary to use any special bearings, so that the apparatus can be miniaturized, and the scan-type optical system can be reduced in weight. Since the general-purpose ball bearings can be used in the apparatus, the costs of the apparatus can be reduced by a large margin.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A light deflecting apparatus comprising:
a rotating shaft;
a rotatable light reflector for scanning a light beam and arranged on one end of the rotating shape;
bearing means for rotatably supporting the rotating shaft, the bearing means having a first bearing member for rotatably supporting the rotating shaft and being arranged outside of the shaft and a second bearing member for rotatably supporting the first bearing member and being arranged outside of the first bearing member, each of said first and second bearing members being rotated at a speed of M or less when a maximum allowable rotation speed of each of said first and second bearing members is M and when said rotating shaft is rotated at a speed of 2 M or less; and
means for rotating the rotating shaft, said rotating means including a rotor coil, a rotatable member integrated with the rotating shaft and fitted with the rotor coil, and a stator coil fixed to the body of the apparatus on the rotating-shaft side of the rotatable member so as to face the rotor coil.

2. The light deflecting apparatus according to claim 1, wherein said rotatable member has said rotor coil coaxial with the rotating shaft, and a cutaway form of said rotatable member along the rotating shaft is substantially U-shaped.

3. The light deflecting apparatus according to claim 1, wherein said first and second bearings members have ball bearings.

4. The light deflecting apparatus according to claim 1, wherein said first and second bearing members have roller bearings.

5. The light deflecting apparatus according to claim 1, wherein said first and second bearing members have solid sleeve bearings.

6. The light deflecting apparatus according to claim 1, wherein said rotating means has a flat motor.

7. A light deflecting apparatus according to claim 1, further comprising a third bearing member for rotatably supporting the rotating shaft and being arranged outside of the shaft and a fourth bearing member for rotatably supporting the third bearing member and being arranged outside of the third bearing member.

8. A light deflecting apparatus according to claim 7, wherein the first and second bearing members are arranged adjacent to the rotatable member, and the third and fourth bearing members are arranged on the other end of the rotating shaft.

9. A light deflecting apparatus according to claim 7, wherein the third and fourth bearing members are coplanar.

10. A light deflecting apparatus according to claim 9, wherein the first and second bearing members are coplanar.

11. A light deflecting apparatus according to claim 1, wherein the first and second bearing members are coplanar.

* * * * *